United States Patent
Osako et al.

(10) Patent No.: US 10,553,839 B2
(45) Date of Patent: Feb. 4, 2020

(54) BATTERY CASE, BATTERY MODULE, AND BATTERY MODULE MANUFACTURING METHOD

(71) Applicant: Mitsubishi Electric Corporation, Chiyoda-ku (JP)

(72) Inventors: Yosuke Osako, Tokyo (JP); Toshihisa Oka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 71 days.

(21) Appl. No.: 15/577,138

(22) PCT Filed: May 28, 2015

(86) PCT No.: PCT/JP2015/065457
§ 371 (c)(1),
(2) Date: Nov. 27, 2017

(87) PCT Pub. No.: WO2016/189745
PCT Pub. Date: Dec. 1, 2016

(65) Prior Publication Data
US 2018/0175338 A1     Jun. 21, 2018

(51) Int. Cl.
*H01M 2/02* (2006.01)
*H01M 2/10* (2006.01)
*H01M 4/00* (2006.01)
*H01M 10/04* (2006.01)

(52) U.S. Cl.
CPC .......... *H01M 2/1016* (2013.01); *H01M 2/02* (2013.01); *H01M 2/10* (2013.01); *H01M 2/1061* (2013.01); *H01M 4/00* (2013.01); *H01M 10/0481* (2013.01)

(58) Field of Classification Search
None
See application file for complete search history.

(56) References Cited

U.S. PATENT DOCUMENTS

| | | |
|---|---|---|
| 9,680,178 B2 | 6/2017 | Deponte et al. |
| 2005/0250005 A1 | 11/2005 | Bacon et al. |
| 2008/0057392 A1 | 3/2008 | Takamatsu et al. |

(Continued)

FOREIGN PATENT DOCUMENTS

| | | |
|---|---|---|
| DE | 10 2008 061 755 A1 | 6/2010 |
| JP | 7-52658 A | 2/1995 |

(Continued)

OTHER PUBLICATIONS

Extended European Search Report dated Jan. 4, 2019 in Patent Application No. 15893379.6, 13 pages.

(Continued)

*Primary Examiner* — Haroon S. Sheikh
(74) *Attorney, Agent, or Firm* — Oblon, McClelland, Maier & Neustadt, L.L.P.

(57) ABSTRACT

A battery case accommodates therein a battery cell that has a first main surface and a second main surface opposite to the first main surface. The battery case includes: a chassis with which the first main surface of the battery cell comes into contact; an adjustment plate placed on the second main surface of the battery cell; and a holding plate that is formed from an elastic member and covers the second main surface of the battery cell with the adjustment plate between the holding plate and the battery cell.

13 Claims, 8 Drawing Sheets

(56) References Cited

U.S. PATENT DOCUMENTS

| | | | |
|---|---|---|---|
| 2012/0171537 A1 | 7/2012 | Sakai et al. | |
| 2015/0214570 A1 | 7/2015 | Deponte et al. | |
| 2017/0054116 A1* | 2/2017 | Morisaku | H01M 2/10 |

FOREIGN PATENT DOCUMENTS

| | | |
|---|---|---|
| JP | 2004-139934 A | 5/2004 |
| JP | 3888283 B2 | 2/2007 |
| JP | 2011-165565 A | 8/2011 |
| JP | 2012-160347 A | 8/2012 |
| JP | 2015-76188 A | 4/2015 |
| WO | WO 2014/026793 A1 | 2/2014 |

OTHER PUBLICATIONS

International Search Report dated Aug. 18, 2015 in PCT/JP2015/065457 filed May 28, 2015.
Office Action dated May 22, 2018 in Japanese Patent Application No. 2017-520195 (with English translation).

* cited by examiner

BATTERY CASE, BATTERY MODULE, AND BATTERY MODULE MANUFACTURING METHOD

FIELD

The present invention relates to a battery case, a battery module, and a battery module manufacturing method, and more particularly relates to a battery cell supporting structure.

BACKGROUND

Battery module technologies have been disclosed in which a battery pack that includes a plurality of battery cells is accommodated in a case. An example of a battery module using a battery pack is described in Patent Literature 1. In Patent Literature 1, a method is employed that makes use of the fact that cells expand during charging and in which a holding plate that is made of SUS and is an elastic member is pressed against a cell so as to secure the cell body and electrodes inside the cell by using the repulsive force against the expansive force.

Meanwhile, it has been confirmed by verification tests that among battery cells, the expansive force of next-generation lithium-ion cells during charging is reduced by approximately 20% to 30% compared with the conventional lithium-ion cells.

In the cell mounting method in Patent Literature 1, an elastic holding plate made of SUS presses against the cell in response to the expansive force of the cell during charging so as to secure the cell body and the electrodes inside the cell. Thus, a reduction in expansive force of next-generation cells leads to a reduction in force that presses against the cell, i.e., a reduction in the pressing force. Accordingly, in order to employ next-generation cells, there needs to be established a cell mounting method that results in an increased pressing force in accordance with required mechanical and environmental conditions.

CITATION LIST

Patent Literature

Patent Literature 1: Japanese Patent No. 3666283

SUMMARY

Technical Problem

However, in next-generation batteries in which lithium-ion cells have a reduced rate of expansion, the battery module case in Patent Literature 1 cannot apply a sufficient pressing force against the battery cell. Thus, there is a problem in that the battery module case may not provide sufficient resistance to vibration under the required mechanical and environmental conditions.

The present invention has been achieved to solve the above problems, and an object of the present invention is to provide a battery case to which a battery can be firmly secured regardless of the rate of expansion and that has a high resistance to vibration.

Solution to Problem

In order to solve the above problems and achieve the object, an aspect of the present invention is a battery case that accommodates therein a battery cell that has a first main surface and a second main surface opposite to the first main surface. The battery case includes: chassis with which the first main surface of the battery cell comes into contact; an adjustment plate placed on the second main surface of the battery cell; and a holding plate that is formed from an elastic member and covers the second main surface of the battery cell with the adjustment plate between the holding plate and the battery cell.

Advantageous Effects of Invention

According to the present invention, there is an effect where it is possible to obtain a battery case to which a battery can be firmly secured regardless of the rate of expansion and that has a high resistance to vibration.

BRIEF DESCRIPTION OF DRAWINGS

FIG. 4 is a diagram illustrating the battery module according to the first embodiment, where FIG. 4(a) is a top view, FIG. 4(b) is a front view, and FIG. 4(c) is a side view.

FIG. 5 is a diagram illustrating the battery module according to the first embodiment during operation, where FIGS. 5(a) and 5(b) are enlarged diagrams of relevant parts before the application of tension and under the application of tension, respectively.

DESCRIPTION OF EMBODIMENTS

A battery case, a battery module, and a battery module manufacturing method according to embodiments of the present invention will be described in detail below with reference to the accompanying drawings. The present invention is not limited to the embodiments.

First Embodiment.

Figure 1:
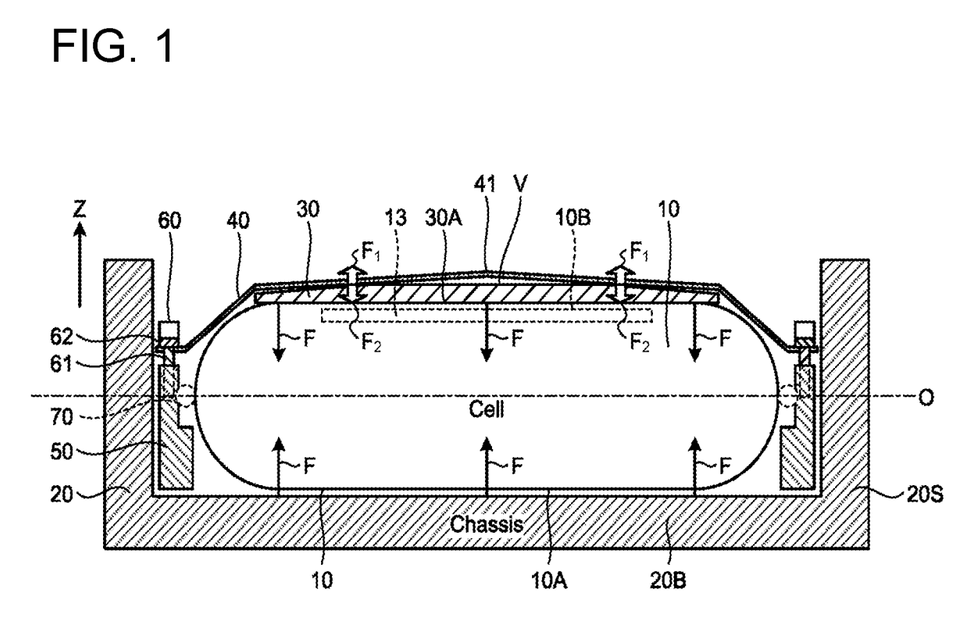
FIG. 1 is a cross-sectional explanatory diagram illustrating a battery module according to a first embodiment.
Figure 2:
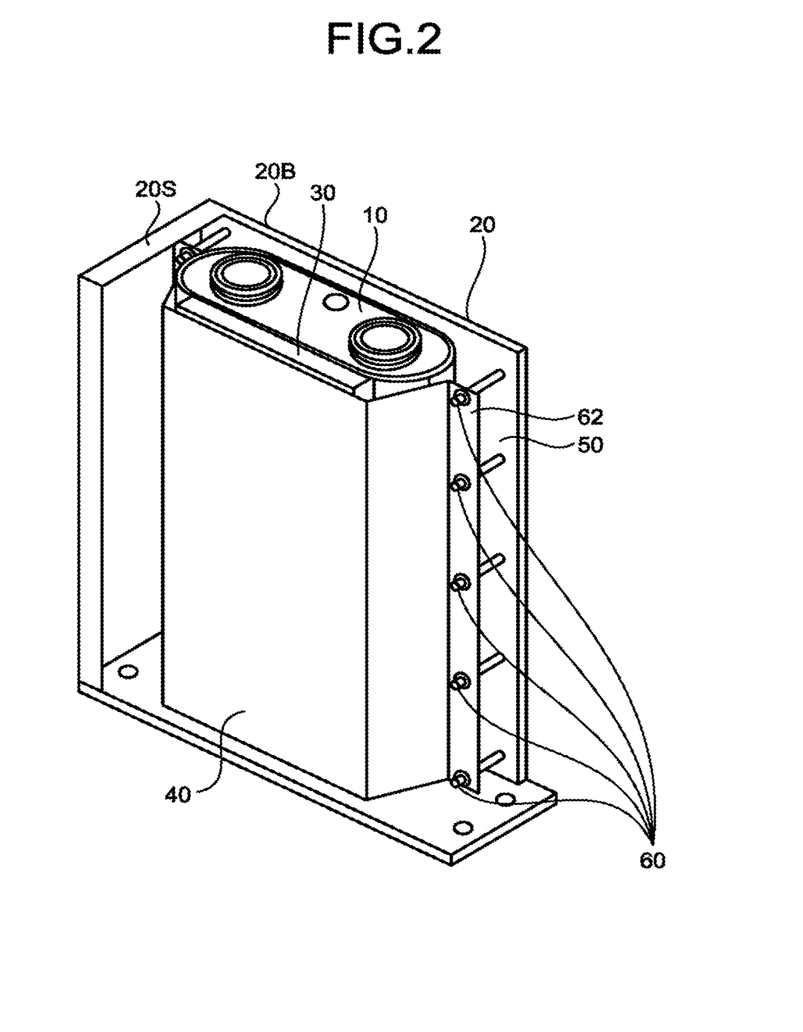
FIG. 2 is a perspective view illustrating the battery module according to the first embodiment.
Figure 3:
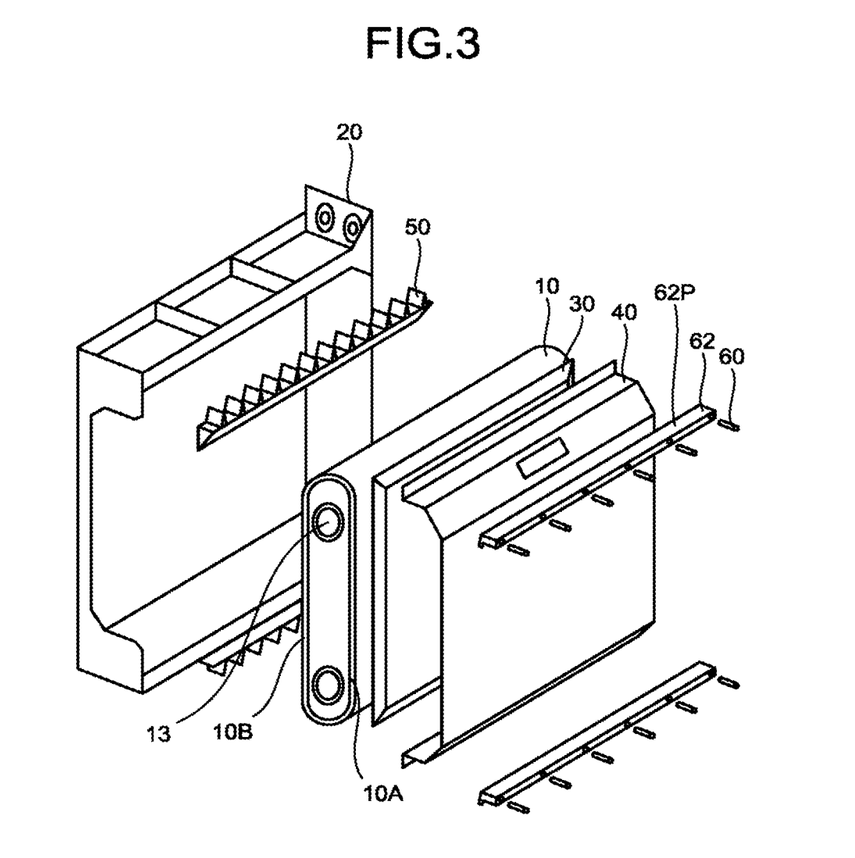
FIG. 3 is an exploded perspective view of the battery module according to the first embodiment.
Figure 4:
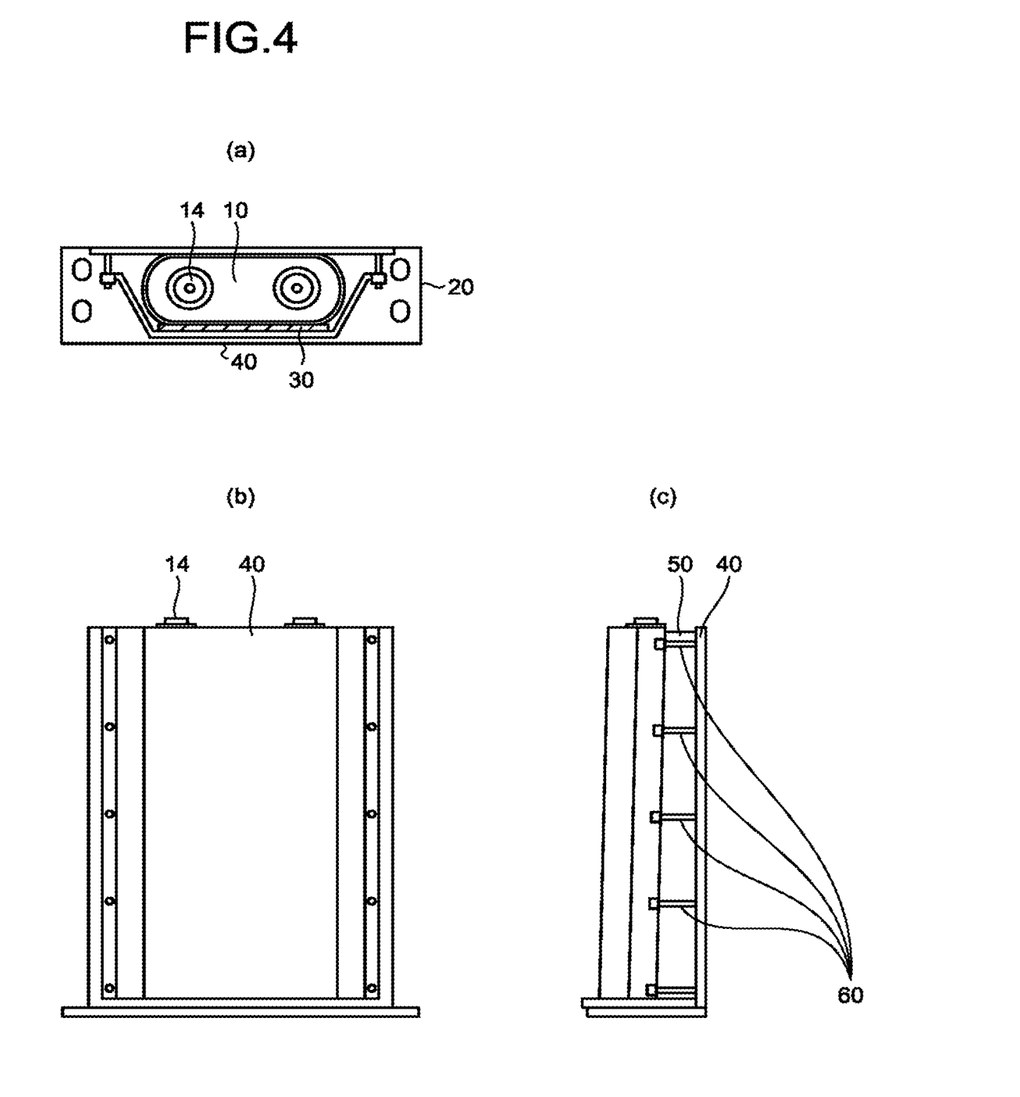
Figure 5:
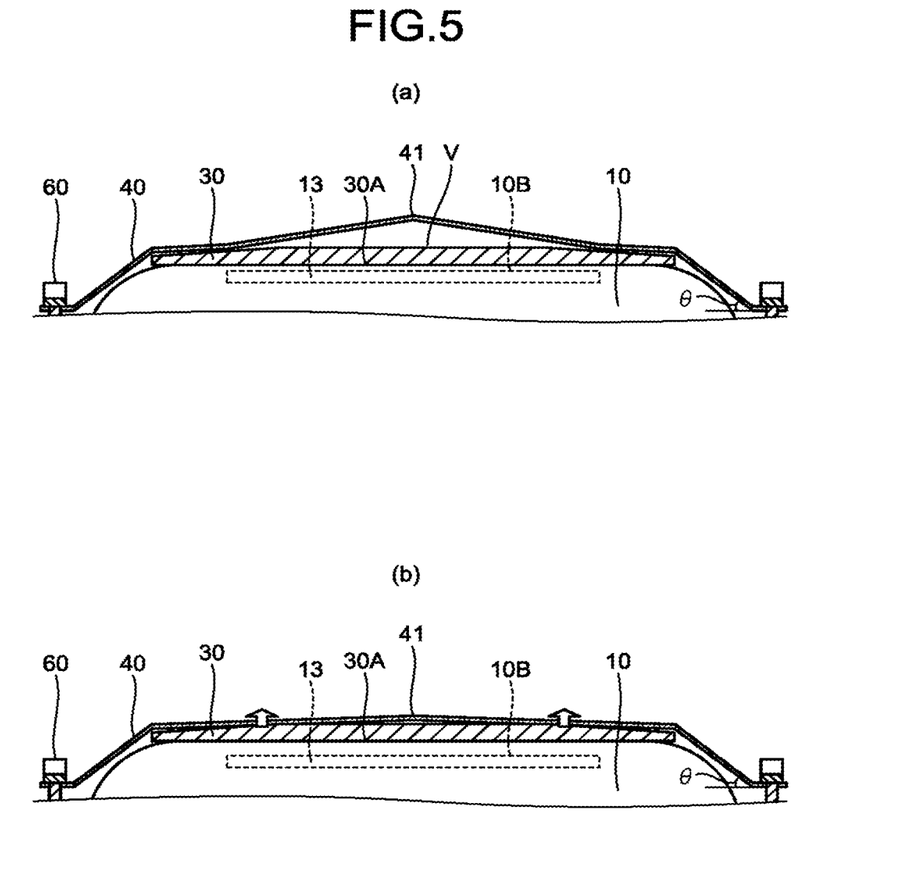

FIG. 1 is a cross-sectional explanatory diagram illustrating a battery module according to a first embodiment. FIG. 2 is a perspective view illustrating the battery module according to the first embodiment. FIG. 3 is an exploded perspective view of the battery module according to the first embodiment. FIG. 4 is a diagram illustrating the battery module according to the first embodiment, where FIG. 4(a) is a top view, FIG. 4(b) is a front view, and FIG. 4(c) is a side view. FIG. 5 is a diagram illustrating the battery module according to the first embodiment during operation, where FIGS. 5(a) and 5(b) are enlarged diagrams of relevant parts before the application of tension and under the application of tension, respectively. The battery module according to the first embodiment is a battery pack module in which a required number of lithium battery cells are connected in series and that is installed in a satellite. This battery module has battery cells 10 accommodated in a battery case. The battery cell 10 has an elliptical cross section and has a first main surface 10A and a second main surface 10B opposite to the first main surface 10A. The battery case in the first embodiment includes a chassis 20, with which the first main surface 10A of the battery cell 10 comes into contact; an adjustment plate 30, which is placed on the second main surface 10B of the battery cell 10; and a holding plate 40, which holds the battery cell 10 so as to cover the second main surface 10B of the battery cell 10 with the adjustment plate 30 therebetween. The holding plate 40 is formed from a stainless steel plate having a thickness of 1 mm and referred to as "SUS400". The holding plate 40 constitutes the battery-cell securing structure that can firmly secure the battery cell only by bolts 60, which are high tensile bolts, in the outer space in which an adhesive cannot be used.

The battery cell 10 is a commonly-used battery cell, and includes an outer can; an electrode structural body that includes two polar plates provided in the outer can; current collector plates respectively connected to the polar plates; and terminal electrodes connected to the current collector plates. In this example, the current collector plate and the terminal electrode for one polarity are only illustrated and the illustration of the current collector plate and the terminal electrode for the other polarity is omitted. The electrode structural body is a rolled body in which two polar plates are rolled with a separator between them and is soaked in an electrolytic solution (not illustrated) within the outer can. The battery cell 10 is configured to generate a charge by a cell reaction in the outer can, which is drawn from the terminal electrodes through the current collector plates.

The chassis 20, which is made of aluminum and accommodates the battery cell 10 therein, includes a bottom plate 20B and side walls 20S provided on both sides of the bottom plate 20B. The adjustment plate 30 is provided at a position corresponding to a current collector plate 13 of the battery cell 10.

It is desirable that the adjustment plate 30 is sized larger than the current collector plate 13 of the battery cell 10 and is placed so as to cover the region facing the current collector plate 13. With this configuration, the current collector plate 13 can be more firmly held in place.

As illustrated in FIG. 1, the adjustment plate 30 has a substantially trapezoidal cross section that is wider toward the battery cell 10. Both end portions of the adjustment plate 30 form tapered surfaces, and thus the both end portions become thinner toward the ends. As described above, a plate member having a trapezoidal cross section is used as the adjustment plate 30. Thus, when a battery is discharged repeatedly and expands, an outer can 11 expands and thereby tension is applied to the holding plate 40. FIGS. 5(a) and 5(b) illustrate enlarged diagrams of the relevant parts before the application of tension and under the application of tension, respectively. When the battery cell 10 illustrated in FIG. 5(a) is discharged and thus expands, the adjustment plate 30 is pushed upward by the expansion of the outer can 11 of the battery cell 10, and then the holding plate 40 is also pushed upward. Consequently, tension acts on the holding plate 40 in such a direction that the holding plate 40 is stretched as illustrated in FIG. 5(b). At this point in time, because the holding plate 40 is thick, the holding plate 40 is not deformed along the shape of the member under the holding plate 40 but functions as a disc spring. Accordingly, the holding plate 40 exerts a resilient force F2 so as to press against the adjustment plate 30. In this case, the adjustment plate 30 has a trapezoid cross section, in which the end portions on the side of the holding plate 40 form tapered surfaces. Consequently, the holding plate 40 presses against the battery cell without being hindered by the adjustment plate 30. At this point in time, the holding plate 40 is stretched, and therefore an inclined angle θ of the end portions of the holding plate 40 relative to the second main surface 10B of the battery cell 10 becomes larger and approximately 40 degrees. A greater force component is directed toward the second main surface 10B of the battery cell 10. As a result, a greater pressing force F is applied to the current collector plate 13 under the second main surface 10B of the battery cell 10, and thereby the current collector plate 13 can be firmly held in place. When the pressing force F is applied to the battery cell 10, an identical pressing force F is also applied as a repulsive force from the bottom plate 20B of the chassis 20.

A surface of the adjustment plate 30, which is opposite to the battery cell 10, is tapered on the outer side and near the position where the holding plate 40 is secured to the side walls 20S of the chassis 20. With this configuration in which the adjustment plate 30 has tapered surfaces, the holding plate 40 presses against the battery cell without being hindered by the adjustment plate 30.

The holding plate 40 is secured to the side walls 20S of the chassis 20 above the central position O of the battery cell 10 in a height direction perpendicular to the first main surface 10A and the second main surface 10B, i.e., closer to the second main surface 10B in such a manner as to have a clearance 70 from the battery cell 10.

The holding plate 40 is secured to support blocks 50 provided at corner portions defined by the bottom plate 20B and the side walls 20S of the chassis 20. The battery cell 10 and each of the support blocks 50 have the clearance 70 between them and thus are not in contact with each other. The holding plate 40 is secured to each of the support blocks 50 by five bolts 60, which are high tensile bolts. Because there is the clearance 70, the holding plate 40 is not hindered by the battery cell 10, and therefore the battery cell 10 is pressed by a uniform pressing force F through the adjustment plate 30.

The support block 50 has such a structure as to be interposed between the chassis 20 and the battery cell 10. Each of the support blocks 50 includes screw holes 51 into which screw threads 61 on the outer periphery of the bolts 60 are screwed, and thus the holding plate 40 can be secured to the support blocks 50.

The bolts 60 have the screw threads 61 on the outer periphery and a washer 62. The washer 62 is configured by integrating washer portions 62P corresponding to five bolts into one piece. When the holding plate 40 is secured to the support blocks 50, the washer 62 is interposed between the bolts 60 and the holding plate 40.

Although five bolts 60 are used on each side, it is also possible to determine the appropriate number N of securing bolts as follows: $N = A \times P / F_t$, where the axial force per securing bolt is $F_t$ [N], the surface pressure needed for holding the battery cell 10 is P [MPa], and the contact area of the battery cell 10 is A [mm]. The bolt type is selected in consideration of the mounting space, the appropriate torque, the external force due to the acceleration generated by the transport environment and the like, the safety factor, and other conditions.

Next, a battery module manufacturing method is described. First, the battery cell 10 is prepared, which is a lithium battery and includes the outer can 11, which has the first main surface 10A and the second main surface 10B opposite to the first main surface 10A; an electrode structural body 12, in which two polar plates provided in the outer can 11 are rolled with a separator between them; the current collector plates 13, which are respectively connected to the polar plates; and terminal electrodes 14, which are connected to the current collector plates 13. Depth of Discharge (DOD) is set to approximately 80%.

Next, the chassis 20 is prepared, which is made of aluminum and which includes the bottom plate 20B and the side walls 20S provided on both sides of the bottom plate 20B. The support blocks 50 made of aluminum are then placed at the corner portions defined by the bottom plate 20B and the side walls 20S of the chassis 20.

Subsequently, the battery cell 10 is placed on the chassis 20 to bring the first main surface 10A of the battery cell 10 into contact with the bottom plate 20B of the chassis 20.

Further, after the first main surface 10A of the battery cell 10 is brought into contact with the chassis 20, the adjustment plate 30 is placed on the second main surface 10B of the battery cell 10. The holding plate 40 is mounted on the adjustment plate 30 from above. The screw threads 61 on the outer periphery of the bolts 60 are screwed into the screw holes 51 formed in the support blocks 50 in order to secure the holding plate 40 to the support blocks 50. At this point in time, the washer 62 is interposed between the bolts 60 and the holding plate 40. The washer 62 is configured by integrating the washer portions 62P for five bolts 60 into one piece.

The holding plate 40 is placed on the second main surface 10B of the battery cell 10 with the adjustment plate 30 between them so as to cover the second main surface 10B of the battery cell 10. The holding plate 40 is secured to the chassis 20 above the center O of the battery cell 10 between the first main surface 10A and second main surface 10B in such a manner as to have the clearance 70 from the battery cell 10. As illustrated in FIG. 1, the holding plate 40 is molded into a convex shape so as to have a convex portion 41 at the central portion.

In the manner as described above, the battery module is formed.

During normal conditions, i.e., when the battery cell 10 is not expanded, the holding plate 40 has a hollow V between the adjustment plate 30 and the holding plate 40 because the holding plate 40 includes the convex portion 41 at the central portion as illustrated in FIG. 5(a). The holding plate 40 is secured to the support blocks 50 with the bolts 60 by using the axial force of the screws. At the time of launching a satellite, the battery cell 10 is fully charged and expanded. At this point in time, as illustrated in FIG. 5(b), there is a repulsive force against a pushing force F1 generated when the battery cell 10 pushes against the holding plate 40 through the adjustment plate 30, i.e., there is a resilient force F2. By using this resilient force F2, the holding plate 40 presses against the second main surface 10B of the battery cell 10 with a uniform force through the adjustment plate 30. The current collector plate 13 of the battery cell 10 is located under the adjustment plate 30. The adjustment plate 30 transmits the resilient force F2 of the holding plate 40 as a uniform pressing force F to the current collector plate 13 of the battery cell 10. Thus, the holding plate 40 firmly holds the battery cell 10, and consequently the current collector plate 13 in place, with a uniform pressing force F. The battery cell 10 is brought into an expanded state and is ready for vibration that occurs at the time of launching a satellite. As described above, at the time of launching a satellite, which is when the battery cell 10 is most likely to receive the vibration, the battery cell 10 is fully charged and is thus in a state of receiving the pressing force due to its expansion. This makes it possible to firmly hold the battery cell 10 in place.

Firstly, the battery module obtained in the manner as described above increases the elastic force of the holding plate 40 by changing the thickness of the holding plate 40, which is usually about 0.3 mm, to 1 mm and thereby increases the pressing force of the holding plate 40. Further, a section where the holding plate 40 is fastened to the support blocks 50 is shifted in the direction of the cell, i.e., above the center O of the battery cell 10 between the first main surface 10A and the second main surface 10E, i.e., shifted toward the second main surface 10E, so that the holding plate 40 does not have a curved portion with a small radius of curvature. Thus, the holding plate 40 has such a shape as to minimise its contact area with the battery cell 10. Therefore, a load path that does not contribute to pressing against the battery cell 10 is reduced, and the entire load acts on the battery cell 10 to press against the battery cell 13.

Secondly, the shape of the support blocks 50 used for positioning the battery cell 10 is changed so as to have the clearance 70 so that the support blocks 50 do not come into contact with the battery cell 10. Therefore, a load path that does not contribute to pressing against the battery cell 10 is reduced, and the entire load acts on the battery cell 10 to press against the battery cell 10.

Thirdly, the adjustment plate 30 through which the entire pressing force is applied to the battery cell 10 is used. Therefore, the application of a uniform pressing force to the battery cell 10 can be achieved. Further, insertion of the adjustment plate 30 increases the upward tension in the holding plate 40 and accordingly increases the pressing force that is the repulsive force against the upward tension.

The expansive force differs depending on the type of battery cell. However, even in a case of using a type of battery cell 10 that has a small expansive force, it is still possible to maintain a sufficient pressing force to hold the battery cell 10 in the battery case.

The holding plate 40 is formed from a stainless steel plate such as SUS400. Alternatively, an elastic member made of iron, iron-containing alloy, titanium, or the like can also be used.

The battery module according to the first embodiment has a structure in which the holding plate 40 and the battery cell 10 are not in contact with each other and the battery cell 10 is pressed by the holding plate 40 through the adjustment plate 30. Therefore, by changing the fastening amount of the bolts 60, the adjustment plate 30 can accommodate thickness tolerances of the battery cell 10, i.e., parallelism tolerances that are supposed to be formed by the contact surface between the battery cell 10 and the chassis 20 and the contact surface between the battery cell 10 and the holding plate 40. For example, in a case where the battery cell 10 has an upwardly protruding shape as illustrated in FIG. 1, a first main surface 30A of the adjustment plate 30 presses against the second main surface 10B of the battery cell 10 with a uniform pressing force. The fastening amount of the bolts 60 at individual positions is changed in order to adjust their axial forces. Therefore, regardless of geometric tolerances and variations in the geometric tolerances of the battery cell 10 and of each of the chassis 20, the adjustment plate 30, and the holding plate 40, the battery module can obtain a more reliable contact state on the contact surfaces.

In the battery module according to the first embodiment, only the first main surface 10A and the second main surface 10B opposite to the first main surface 10A having the largest area in the battery cell 10 are respectively in contact with the chassis 20 and the adjustment plate 30. The chassis 20 and the holding plate 40 are not in direct contact with each other. Thus, the structural strength of the battery module is dependent on the structure of the chassis 20. Any force other than the external force due to the mechanism for holding the battery cell 10 does not act on the battery cell 10 and the holding plate 40. This prevents the holding plate 40 from being deformed by an external environmental force applied to the chassis 20 such as vibration or impact and prevents the most important function of applying a surface pressure to the battery cell 10 and holding the battery cell 10 in place from being impaired. Therefore, the strength and heat radiation characteristics of the battery module can be maintained.

The holding plate 40 is secured to the side walls of the chassis 20 on the upper side of the battery cell 10, i.e., above the central position O in a height direction perpendicular to the first and second main surfaces 10A and 10B, i.e., closer to the second main surface 10B. With this secured position, the holding plate 40 can efficiently press against the second main surface 10B of the battery cell 10 through the adjustment plate 30 on the side of the first main surface 30A of the adjustment plate 30 in such a manner that, even when the battery cell 10 expands, it is not hindered by the battery cell 10.

Furthermore, the holding plate 40 is formed from a thick elastic member with a thickness greater than or equal to 1 mm. Thus, on the contact surface between the battery cell 10 and the holding plate 40, the contact surface of the holding plate 40 is deformed along the shape of the contact surface of the battery cell 10 or is twisted and thus presses only against the adjustment plate 30 using an elastic force without coming into contact with the battery cell 10. Consequently, a better and uniform holding state can be obtained. Therefore, the current collector plate 13 is firmly held in place by the adjustment plate 30. The relation between the thickness and the pressing force is determined on the basis of the experimental results and it is found out that, when the thickness of the holding plate 40 is greater than or equal to 1 mm, the pressing force substantially does not increase as the thickness of the holding plate 40 increases. Therefore, the upper limit of the thickness of the holding plate is defined as 1 mm.

Accordingly, the holding plate can not only provide the ability to efficiently radiate heat generated in the battery cell 10 but can also firmly hold the electrode structural body 12 inside the battery cell 10, particularly the current collector plate 13. As a result, the holding plate 40 can improve the reliability of the battery module under impact. In order to further improve the heat radiation performance, it is possible that a thin sheet with high heat conductivity is interposed on the contact surface between the chassis 20 and the battery cell 10, between the holding plate 40 and the adjustment plate 30, and on the contact surface between the adjustment plate 30 and the battery veil 10.

Taking into account the state of deformation the holding plate 40 after having been mounted, the holding plate 40 is molded into a convex shape in advance. This can change the distribution of pressure in the contact surface between the battery cell 10 and the holding plate 40.

The holding plate 40 is formed from a stainless steel plate. However, as long as the holding plate 40 can press against the adjustment plate 30, it is also possible to appropriately modify the holding plate 40 for the purpose of reducing weight. For example, a hollow or a recess portion may be formed in the intermediate portion of the holding plate 40 or its structural body may be constructed only from a beam.

It is also possible that the chassis 20 has a configuration to achieve a reduction in weight by eliminating unnecessary portions.

Furthermore, in the embodiment described above, the battery cell 10 having an elliptical cross section is used. However, it is also possible to appropriately change the shape of the battery cell 10 to, for example, a rectangular shape or a circular shape in cross section.

It is also possible to appropriately modify the support blocks 50, and it is possible that the support blocks 50 are integrated with the chassis 20.

In the first embodiment, the washer portions 62P for five bolts are integrated into one piece. However, it is obvious that a washer can be provided for each individual bolt.

Furthermore, the number of batteries required is determined in accordance with the required output. However, not only the number of batteries is increased or reduced, but a structure, in which the battery module according to the first embodiment is defined as a unit and a plurality of the battery modules are connected, is also effective.

In the first embodiment, the holding plate 40 includes the convex portion 41 and is formed from an elastic member that exerts a resilient force directed inward. However, it is not always necessary to form a convex portion at the central portion of the holding plate 40. It is also possible that a plurality of bent portions are formed at a peripheral portion. In other words, the shape of the ding plate 40 is not limited. It is sufficient if a plate member itself that constitutes the holding plate 40 exerts a resilient force directed toward the battery cell 10. Further, it is not always necessary to form the hollow portion V.

Second Embodiment.

Figure 6:
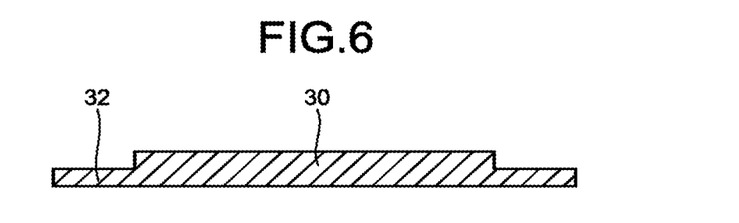
FIG. 6 is a cross-sectional diagram illustrating an adjustment plate that is used in a battery module according to a second embodiment.

FIG. 6 is a cross-sectional explanatory diagram illustrating an adjustment plate that is used in a battery module according to a second embodiment of the present invention. In the first embodiment, the adjustment plate 30 has a trapezoidal cross section. In the present embodiment, the adjustment plate 30 is formed with thinner portions 32 instead of the tapered surfaces in order to prevent interference with the holding plate 40. This configuration also makes it possible to prevent interference between the holding plate 40 and the adjustment plate 30 and to press against the battery cell 10 by a uniform pressing force.

Third Embodiment.

Figure 7:
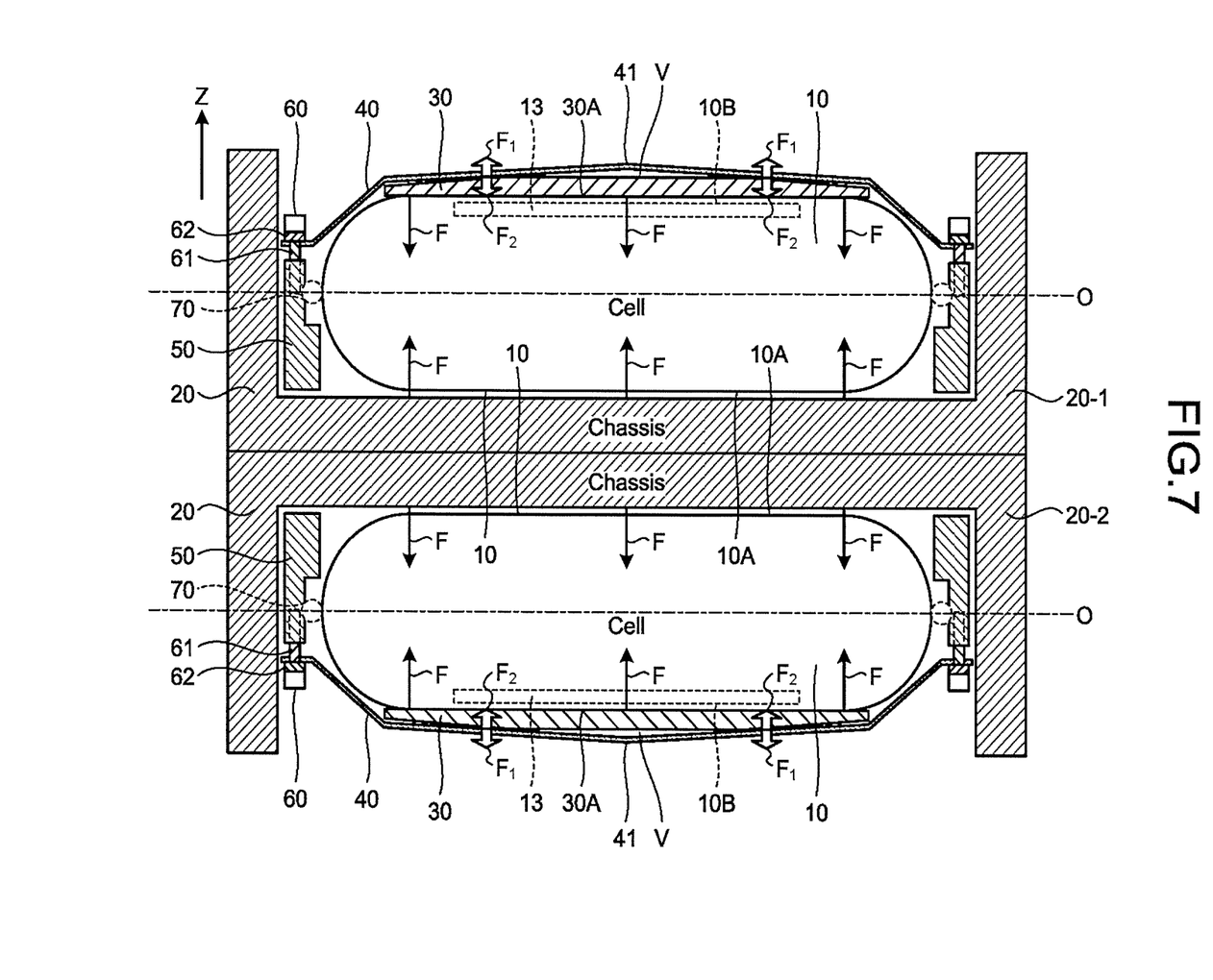
FIG. 7 is a cross-sectional explanatory diagram illustrating a battery module according to a third embodiment.
Figure 8:
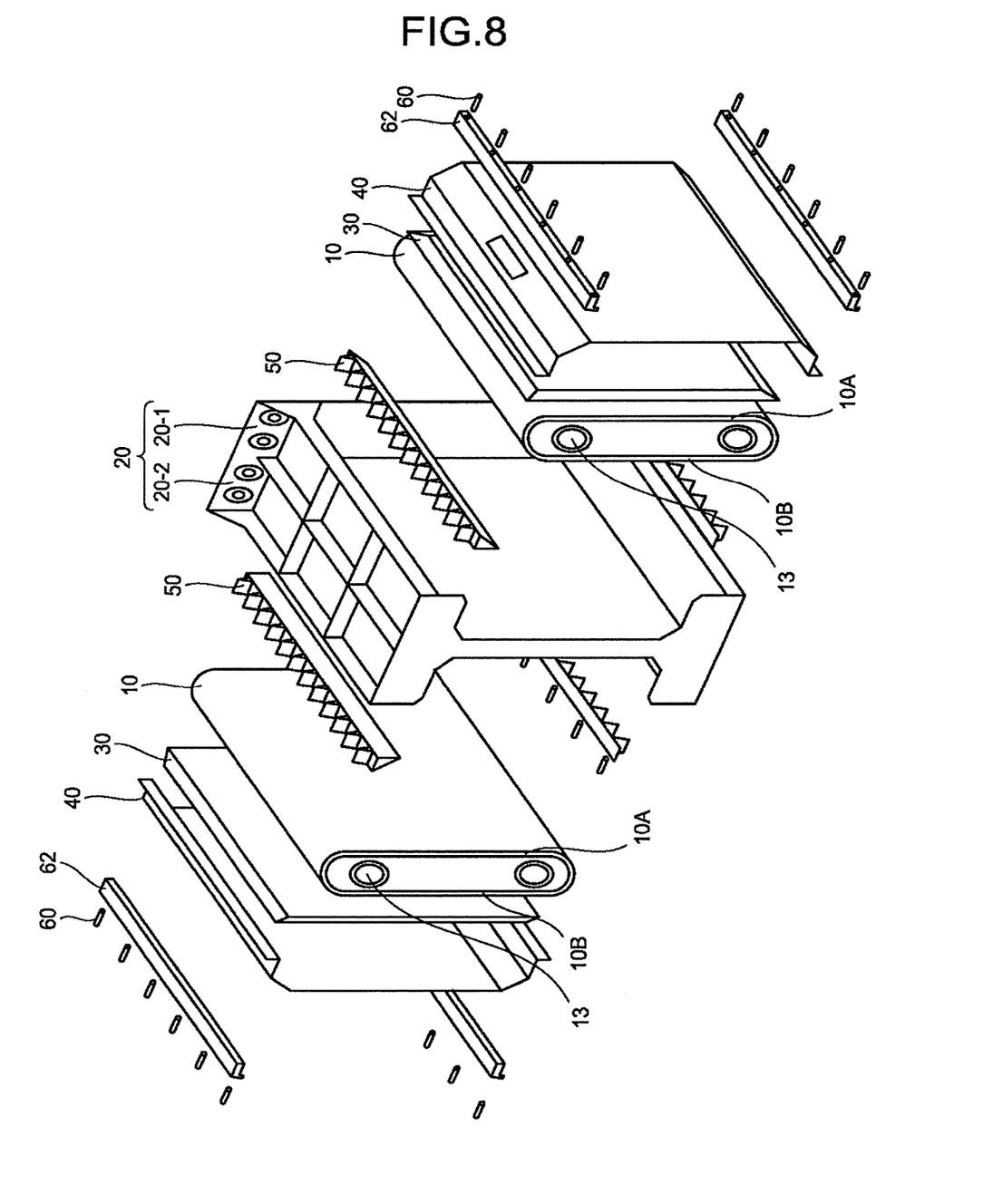
FIG. 8 is an exploded perspective view illustrating the battery module according to the third embodiment.

FIG. 7 is a cross-sectional explanatory diagram illustrating a battery module according to a third embodiment of the present invention. FIG. 8 is an exploded perspective view illustrating the battery module according to the third embodiment.

In the battery module according to the third embodiment, the battery modules according to the first embodiment are arranged back to back in two rows. The battery module according to the third embodiment is only different from the first embodiment in that a first chassis 20-1 and a second chassis 20-2 are integrally formed along their back sides into the chassis 20. Other constituent elements are the same as those in the battery module according to the first embodiment. That is, the battery modules according to the first embodiment are arranged back to back in two rows.

The battery module according to the third embodiment has the same configuration as that in the first embodiment. However, stresses are applied on both sides in such a direction that they cancel out one another. This makes it possible to more reliably hold the battery cell in place.

Fourth Embodiment.

Figure 9:
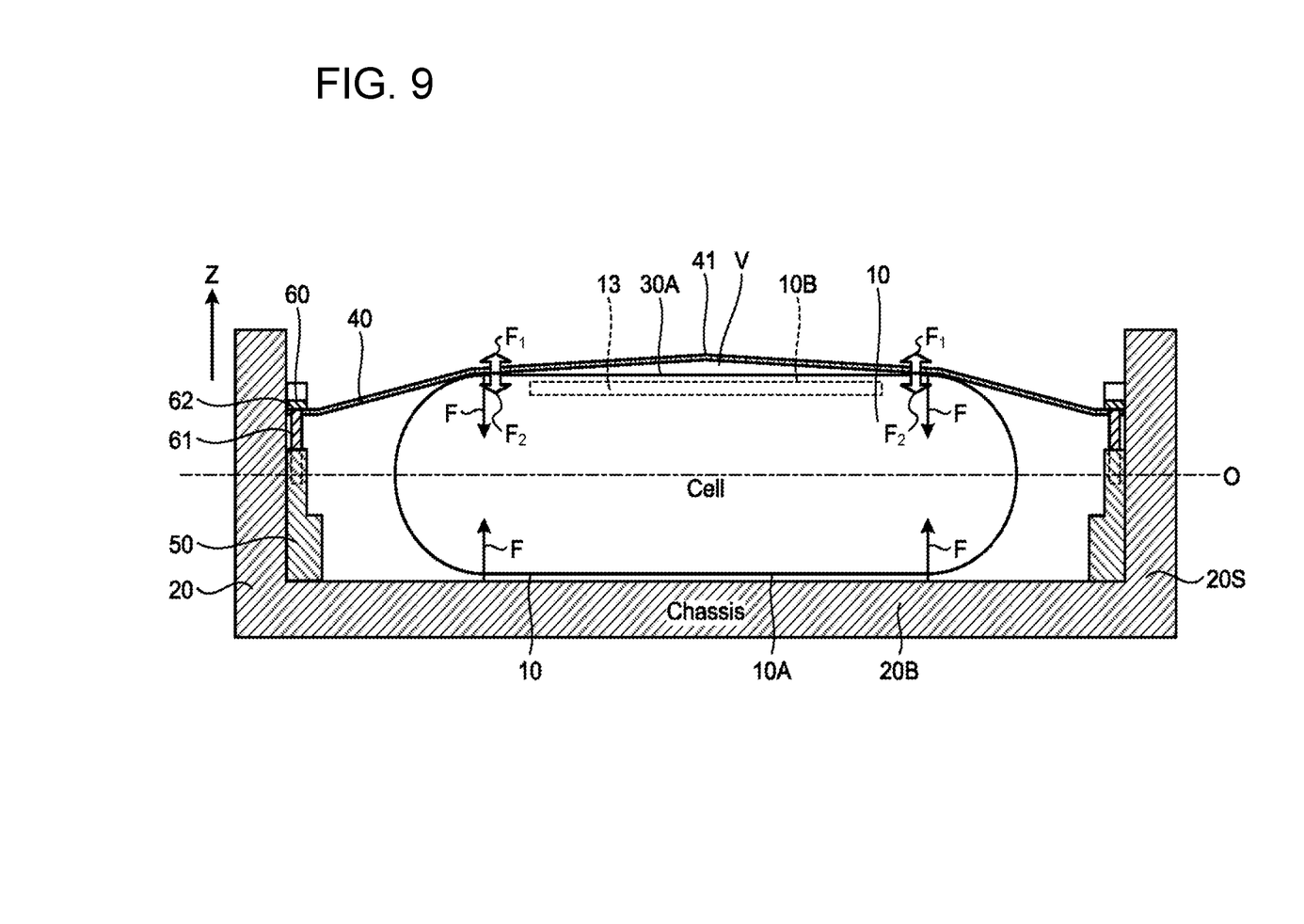
FIG. 9 is a cross-sectional explanatory diagram illustrating a battery module according to a fourth embodiment.

FIG. 9 is a cross-sectional explanatory diagram illustrating a battery module according to a fourth embodiment of the present invention. The battery module according to the present embodiment is only different from the first embodiment in that the battery module does not include the adjustment plate 30. Other constituent elements are identical to those in the battery module according to the first embodiment. Like constituent elements are denoted by like reference signs. That is, it is not necessary to provide an adjustment plate as long as the holding plate 40 has a shape such that it does not interfere with the battery cell 10 at its peripheral portion near the support block 50.

The battery module according to the fourth embodiment includes the chassis 20, with which the first main surface 10A of the battery cell 10 comes into contact, and the holding plate 40 that is formed from an elastic member with a thickness greater than or equal to 1 mm and that covers the second main surface 10B of the battery cell 10. The holding plate 40 is secured to the side walls of the chassis above the central position O of the battery cell 10 in a height direction perpendicular to the first and second main surfaces 10A and 10B, i.e., closer to the second main surface 10B.

That is, the holding plate 40 is secured to the side walls of the chassis on the upper side of the battery cell 10, i.e., above the central position O in a height direction perpendicular to the first and second main surfaces 10A and 10B, i.e., closer to the second main surface 10B. With this secured position, the holding plate 40 can efficiently press against the second main surface 10B of the battery cell 10 on the side of the first main surface 30A of the adjustment plate 30 in such a manner that, even when the battery cell 10 expands, it is not hindered by the battery cell 10.

The configurations described in the above embodiments are only examples of the content of the present invention. The configurations can be combined with other well-known techniques, and part of each configuration can be omitted or modified without departing from the scope of the present invention.

REFERENCE SIGNS LIST

10 battery cell, 10A first main surface, 10B second main surface, 11 outer can, 12 electrode structural body, 13 current collector plate, 14 terminal electrode, 20 chassis, 20B bottom plate, 20S side wall, 30 adjustment plate, 32 thinner portion, 40 holding plate, 41 convex portion, 50 support block, 60 bolt, 61 screw thread, 62 washer, 62P washer portion, 70 clearance, F1 pushing force, F2 resilient force, F pressing force.

The invention claimed is:

1. A battery case that accommodates therein a battery cell that has a first main surface and a second main surface opposite to the first main surface, the battery case comprising:
  a chassis with which the first main surface of the battery cell comes into contact;
  an adjustment plate placed on the second main surface of the battery cell; and
  a holding plate that is formed from an elastic member and covers the second main surface of the battery cell with the adjustment plate between the holding plate and the battery cell,
  wherein the holding plate is secured to a side wall of the chassis above a central position of the battery cell and below the second main surface in a height direction perpendicular to the first main surface and the second main surface.

2. The battery case according to claim 1, wherein the battery cell includes
  an outer can,
  two polar plates provided in the outer can,
  a current collector plate connected to the polar plates, and
  a terminal electrode connected to the current collector plate, and
  the adjustment plate is provided at a position corresponding to the current collector plate of the battery cell.

3. The battery case according to claim 2, wherein the adjustment plate is sized larger than the current collector plate of the battery cell and covers a region facing the current collector plate.

4. The battery case according to claim 1, wherein the holding plate has a thickness greater than or equal to 1 mm.

5. The battery case according to claim 1, wherein
  the holding plate is secured to a support block provided at a corner portion defined by a bottom plate and the side wall of the chassis, and
  the battery case has a clearance between the battery cell and the support block.

6. The battery case according to claim 5, wherein the holding plate is secured to the support block by a plurality of bolts.

7. The battery case according to claim 1, wherein the holding plate is an elastic member made of iron, iron-containing alloy, or titanium.

8. The battery case according to claim 1, wherein the adjustment plate has a trapezoidal cross section that is wider toward the battery cell.

9. The battery case according to claim 1, wherein the adjustment plate is formed with a recess portion on an outer side of a surface facing the battery cell and near a position where the holding plate is secured to the side wall of the chassis.

10. A battery module comprising:
  the battery case according to claim 1;
  a battery cell that is placed such that the first main surface thereof comes into contact with the chassis; and
  a holding plate that holds the battery cell in place so as to cover the second main surface of the battery cell with the adjustment plate placed on the second main surface of the battery cell between the holding plate and the battery cell.

11. The battery module according to claim 10, wherein
  two chassis are integrally formed such that one side of each of the chassis, on which the battery cell is installed, faces outward, and
  the battery cells are mounted respectively on the chassis such that the first main surfaces of the battery cells are parallel to each other.

12. A battery case that accommodates therein a battery cell that has a first main surface and a second main surface opposite to the first main surface, the battery case comprising:
  a chassis with which the first main surface of the battery cell comes into contact; and
  a holding plate that is formed from an elastic member with a thickness greater than or equal to 1 mm and covers the second main surface of the battery cell, wherein
  the holding plate is secured to a side wall of the chassis above a central position of the battery cell and below the second main surface in a height direction perpendicular to the first main surface and the second main surface.

13. A battery module manufacturing method comprising:
  placing on a chassis a battery cell and bringing a first main surface of the battery cell into contact with the chassis, the battery cell including an outer can that has the first main surface and a second main surface opposite to the first main surface, two polar plates provided in the outer can, a current collector plate connected to the polar plates, and a terminal electrode connected to the current collector plate;

placing a holding plate formed from an elastic member on the second main surface of the battery cell with an adjustment plate between the holding plate and the battery cell so as to cover the second main surface of the battery cell, and securing the holding plate to the chassis above a center of the battery cell between the first main surface and the second main surface and below the second main surface in such a manner as to have a clearance from the battery cell.

* * * * *